United States Patent Office 3,646,203
Patented Feb. 29, 1972

3,646,203
METHOD OF TREATING MILK FEVER IN DAIRY CATTLE WITH 25-HYDROXYCHOLECALCIFEROL
Hector F. De Luca, Madison, Wis., assignor to Wisconsin Alumni Research Foundation, Madison, Wis.
No Drawing. Filed Apr. 30, 1969, Ser. No. 820,673
Int. Cl. A61k 15/02, 27/00
U.S. Cl. 424—236                               4 Claims

ABSTRACT OF THE DISCLOSURE

A method of treatment and prophylaxsis for milk fever in dairy cattle which comprises internally administering to the cattle 25-hydroxy-cholecalciferol.

---

This invention relates to a method of treatment and prophylaxsis for milk fever disease in dairy cattle using 25-hydroxycholecalciferol.

Milk fever (parturient paresis) is a metabolic disease of dairy cows in which the cows fail to absorb or mobilize enough calcium at the time of parturition to provide for the production of milk. The disease is manifested by a decrease in plasma calcium, usually between six to thirty hours after parturition, to a value so low as to induce tetany with resultant immobilization of the cow. For example, the plasma calcium level in a cow prior to calving is about 10 mg./100 ml. (or 10 mg. percent). Following parturition this level will normally dip to about 7–8 mg. percent but will then rise in a reasonable time to the more normal 10 mg. percent range. In a cow afflicted with milk fever, however, after parturition the plasma calcium may dip drastically into the 5 mg. percent range and it is recognized that at plasma calcium levels below about 5.5 mg. percent the cow will go into tetany. If treatment for such condition is not immediate and successful there is a real danger that the cow may die or be afflicted with a lasting paralysis, or at the very least that its milk production will be substantially decreased. (See "Milk Fever: Causes, Methods of Treatment and Prevention" S. H. Morrison, vol. 1, No. 2, a publication of Borden Chemical Company and J. M. Payne, Brit, Vet. Assn. "Recent Advances in Our Knowledge of Milk Fever," presented at 87th Annual Congress of the Association, Sept. 6, 1964.)

The incidence of milk fever disease has been estimated to be in the range from about 3.5–5% of the world's dairy cows. In individual herds, however, the incidence may be as high as 60–70%. It appears that the incidence of the disease is highest among high milk producing cows during the third and later lactation periods although at times it has been observed in the second lactation period. In any event, once a cow has had milk fever there is an 80–90% probability that she will again be so afflicted after her next parturition.

Prior to the present invention various methods had been suggested for the treatment of milk fever. For example, feeding of a low calcium diet or feeding a high phosphate in a grain ration, which is tantamount to a low calcium diet, has been suggested as a preventative for the disease. Since, however, it is necessary to feed cattle a high calcium diet during their nonlactating periods to replenish the calcium stores depleted by previous milking such treatment is not a very practical solution for milk fever problem. Other methods of treatment suggested include air inflation of the udder—a treatment not used because of the danger of mastitis and other infection—and acidification of silage which alleviated the disease. This latter method is impractical because of problems engendered by the acid intake.

Currently, the most widely used treatment for milk fever is the administration of vitamin D in massive dosage. For example, in one method the cow is fed 20 million units per day of vitamin D for three to seven days before calving while in another method 10 million units of vitamin D is injected intramusculary before calving. Although these methods are of value they are associated with potentially high risk and other disadvantages. With administration of such large dosages of vitamin D there is a real danger of vitamin D toxictiy and, as a consequence, death of the cow or damage through abnormal calcification of the soft tissues such as the kidney, aorta, etc. Even if the animal survives without damage the milk produced would not be fit for human or calf consumption for some time because of the high content of vitamin D in the milk.

It has now been found that milk fever in dairy cattle can be effectively treated and prevented by administering to the cattle effective amounts of 25-hydroxycholecalciferol. This compound has been found to be more effective than vitamin D in antirachitic activity and to much more rapidly stimulate bone mobilization and calcium absorption as is more fully described in copending application for U.S. Letters Patent, Ser. No. 741,239, filed July 1, 1968, now Pat. No. 3,565,924. In general, dosages in the range from about 10,000 IU to about 20,000 IU of 25-hydroxycholecalciferol (about 200 to 400 μg.) have been found to be quite effective in preventing milk fever when administered from about 24–72 hours before calving occurs. If more than about five days elapses from the time of administering the first dose and calving has not occurred an additional dose may be given. The dosage is not critical and can be varied depending at least in part upon the size of the animal. Sufficient amounts should be used to induce the treatment and prophylaxsis in any event. The use of more than enough of 25-hydroxy-cholecalciferol to accomplish the ends sought should be avoided as an economically unsound practice.

Effective and practical administration of the 25-hydroxycholecalciferol can be accomplished by injection of the material intravenously, intramusculary or subcutaneously, while dissolved in a suitable vehicle such as an innocuous oil or propylene glycol, or orally as, for example, in bolus or capsule form.

The following example is intended to be illustrative only and is not to be construed as limiting the appended claims.

EXAMPLE

Plasma calcium levels were obtained on a number of cows after parturition, some of which had receive 200 μg. of 25 - hydroxycholecalciferol (25-HCC) by intravenous injection 24–72 hours prior to parturition and some of which had received no 25-hydroxycholecalciferol. All of the cows had a previous history of milk fever disease. The results are shown in the following table where cows 1–6 showed no milk fever symptoms and cows 7–9 were immobilized by the disease.

TABLE

| Cow | 25-HCC administered, μg. | Time of calving after treatment | Ca-Mg, percent |
|---|---|---|---|
| 1 | 200 | 24 | 7.1 |
| 2 | 200 | 72 | 9.7 |
| 3 | 200 | 24 | 6.8 |
| 4 | 200 | 26 | 6.4 |
| 5 | 200 | 36 | 8.5 |
| 6 | 200 | 48 | 8.2 |
| 7 | 0 | | 5.1 |
| 8 | 0 | | 5.4 |
| 9 | 0 | | 5.5 |

It is evident from the foregoing data that 25-hydroxycholecalciferol is effective in maintaining plasma calcium at reasonable levels after parturition and in preventing milk fever.

Having thus described the invention what is claimed is:

1. The method of treatment and prophylaxsis for milk fever disease (parturient paresis) in dairy cattle which comprises internally administering to the cattle 25-hydroxycholecalciferol in an amount sufficient to induce said treatment and prophylaxsis.

2. The method of claim 1 in which the treatment comprises administering from about 200 to about 400 µg. of 25-hydrocholecalciferol to each cow at least one day prior to calving.

3. The method of claim 1 in which the treatment is by injection.

4. The method of claim 1 in which the treatment is oral.

References Cited
UNITED STATES PATENTS 3,032,468   5/1962   Ham et al. _____ 424—236

SAM ROSEN, Primary Examiner